(12) United States Patent
Fukuda et al.

(10) Patent No.: US 11,288,965 B2
(45) Date of Patent: Mar. 29, 2022

(54) VIBRATION CONTROL DEVICE

(71) Applicant: PIONEER CORPORATION, Tokyo (JP)

(72) Inventors: Tatsuya Fukuda, Saitama (JP); Mitsuo Yasushi, Saitama (JP); Takashi Iizawa, Saitama (JP); Kenta Isozaki, Saitama (JP); Takashi Morishige, Saitama (JP)

(73) Assignee: PIONEER CORPORATION, Tokyo (JP)

(*) Notice: Subject to any disclaimer, the term of this patent is extended or adjusted under 35 U.S.C. 154(b) by 0 days.

(21) Appl. No.: 16/642,087

(22) PCT Filed: Aug. 28, 2018

(86) PCT No.: PCT/JP2018/031761
§ 371 (c)(1),
(2) Date: Feb. 26, 2020

(87) PCT Pub. No.: WO2019/044826
PCT Pub. Date: Mar. 7, 2019

(65) Prior Publication Data
US 2020/0184822 A1   Jun. 11, 2020

(30) Foreign Application Priority Data
Aug. 31, 2017   (JP) .............................. JP2017-167515

(51) Int. Cl.
*B60N 2/90*      (2018.01)
*G08G 1/16*      (2006.01)
*B60Q 9/00*      (2006.01)

(52) U.S. Cl.
CPC ............... *G08G 1/166* (2013.01); *B60N 2/90* (2018.02); *B60Q 9/008* (2013.01)

(58) Field of Classification Search
CPC .......... G08G 1/166; B60N 2/90; B60Q 9/008; G06F 3/01; A63F 13/211; A63F 13/23;
(Continued)

(56) References Cited

U.S. PATENT DOCUMENTS 10,479,271 B2   11/2019   Hashimoto et al.
2016/0129920 A1   5/2016   Hall et al.
(Continued)

FOREIGN PATENT DOCUMENTS

JP   2000-225877   8/2000
JP   2001-199296 A   7/2001
(Continued)

OTHER PUBLICATIONS

International Search Report, PCT/JP2018/031761, dated Oct. 9, 2018.
(Continued)

*Primary Examiner* — Hai Phan
*Assistant Examiner* — Anthony D Afrifa-Kyei
(74) *Attorney, Agent, or Firm* — Nixon & Vanderhye (57) ABSTRACT

A vibration control device which can make a user recognize a vibration by using a plurality of vibration units appropriately is provided. In a first vibration pattern, by interposing a low-vibration period (Ti) between a first standard vibration period (T1) and a second standard vibration period (T2), a user recognizes more easily a vibration by a vibration unit which vibrates in the second standard vibration period (T2). Therefore, even when the user's weight acts on the vibration unit which vibrates in the second standard vibration period (T2) lightly, the vibration of this vibration unit is easily recognized.

8 Claims, 10 Drawing Sheets

(58) Field of Classification Search
CPC ........ A63F 13/50; A63F 13/285; A63F 13/00; A63F 13/25; A63F 13/28
See application file for complete search history.

(56) References Cited

U.S. PATENT DOCUMENTS

| | | |
|---|---|---|
| 2016/0347329 A1 | 12/2016 | Zelman et al. |
| 2017/0225618 A1 | 8/2017 | Tanaka |
| 2018/0326902 A1* | 11/2018 | Hashimoto .............. B60N 2/90 |

FOREIGN PATENT DOCUMENTS

| | | |
|---|---|---|
| JP | 2009-298281 | 12/2009 |
| JP | 2017-095017 | 6/2017 |
| JP | 2017-140952 | 8/2017 |

OTHER PUBLICATIONS

Extended European Search Report issued in European Patent Application No. 18849761.4 dated Apr. 26, 2021.

* cited by examiner

VIBRATION CONTROL DEVICE

TECHNICAL FIELD

This invention relates to a vibration control device which controls a plurality of vibration units.

BACKGROUND ART

A mobile object such as a vehicle or the like may be configured so as to raise an alarm to a passenger (particularly a driver) when detecting approach of an obstacle (other vehicles, a road installation article, a pedestrian, or the like) by being provided with a sensor or an alarm device. There is proposed to use a vibrating body (a vibration unit) which generates a vibration when an alarm is raised in such a manner (for example, refer to Patent Literature 1).

A notification system described in Patent Literature 1 has two vibration bodies placed in a seat cushion (a seat surface portion) of a seat device for a vehicle configuring a seat and one vibration unit placed in a seat back (a backrest portion), and controls these vibration bodies. At this time, by selecting the vibration body to be vibrated according to a direction to which the obstacle is approaching, the passenger is made to recognize from which direction the obstacle is approaching.

CITATION LIST

Patent Literature

[Patent Literature]: Japanese Unexamined Patent Application Publication No. 2000-225877

SUMMARY OF INVENTION

Technical Problem

In a case where a plurality of vibration units are vibrated, various vibration patterns may be considered as described in Patent Literature 1, and a pattern to vibrate the plurality of vibration bodies for the same period of time may also be considered. At this time, since a way a seated person feels the vibration is different from the one in a case where only one vibration unit is vibrated, there was a case where it was difficult to recognize appropriately all vibrations when the plurality of vibration units were just simply vibrated.

Therefore, an example of the problem to be solved by the present invention is to provide a vibration control device which is capable of making a user recognize vibrations appropriately by using a plurality of vibration units.

Solution to Problem

In order to solve the problem and to achieve the object aforementioned, a vibration control device of the present invention described in claim 1 includes:

a control portion independently controlling a plurality of vibration units capable of generating a vibration which stimulates a user's body, in which the control portion controls, in a case where two or more of the plurality of vibration units are vibrated for a same period of time, a low-vibration period in which amplitude of all of the vibration units is smaller than each standard amplitude thereof so that the low-vibration period is interposed between a first standard vibration period wherein only a part of the vibration units is vibrated at the standard amplitude and a second standard vibration period wherein only another part of the vibration units is vibrated at the standard amplitude.

A vibration control method of the present invention described in claim 8 is a vibration control method independently controlling a plurality of vibration units capable of generating a vibration which stimulates a user's body, the vibration control method performed by a vibration control device and including:

controlling, in a case where two or more of the plurality of vibration units are vibrated for a same period of time, a low-vibration period in which amplitude of all of the vibration units is smaller than each standard amplitude thereof so that the low-vibration period is interposed between the first standard vibration period in which only a part of the vibration units is vibrated at the standard amplitude and a second standard vibration period in which only another part of the vibration units is vibrated at the standard amplitude.

DESCRIPTION OF EMBODIMENT

An embodiment of the present invention will be described below. A vibration control device according to the embodiment of the present invention includes a control portion which controls a plurality of vibration units capable of generating a vibration which stimulates a user's body independently. In a case where two or more of the plurality of vibration units are vibrated for a same period of time, a low-vibration period in which amplitude of all of the vibration units is smaller than each standard amplitude thereof so that the low-vibration period is interposed between a first standard vibration period in which only a part of the vibration units is vibrated at the standard amplitude and a second standard vibration period in which only another part of the vibration units is vibrated at the standard amplitude.

According to such a vibration control device in the present embodiment, by interposing the low-vibration period in between the first standard vibration period in which only the part of the vibration units is vibrated at the standard amplitude and the second standard vibration period in which only another part of the vibration units is vibrated at the standard amplitude, a user recognizes more easily a vibration of another vibration unit. That is, compared with a case in which the same amplitude is continuing, the user recognizes more easily the vibration in a case where the vibration is started from a vibration stopped state, or the amplitude is made large from a state in which the amplitude is small, and the user recognizes more easily the vibration in the second standard vibration period which follows after the low-vibration period.

The user's weight may act on the vibration unit lightly depending on posture of the user, and the vibration may not be easily recognized. Since the vibration in the other part of the vibration units is easily recognized in the second standard vibration period as described above, even when the user's weight acts on a part of the vibration units greatly and acts on another part of the vibration units lightly, vibrations of these vibration units are easily recognized.

The control portion preferably alternates the first standard vibration period with the second standard vibration period having the low-vibration period interposed therebetween. Thereby, since both of the first standard vibration period and the second standard vibration period follow the low-vibration period, both vibrations of a part of the vibration units and another part of the vibration units is easily recognized.

Duration of the low-vibration period is preferably equal to or longer than the shortest time taken by the user to be able to recognize that a stimulus by the vibration is gone. Thereby, a user recognizes easily the vibration of the vibration unit.

The plurality of vibration units are preferably placed in different locations in one seat in a mobile object. Further, it is preferable that at least one of the plurality of vibration units is placed in a seat surface portion of the seat and that at least one of the plurality of vibration units is placed in a backrest portion of the seat. Further, the control portion preferably vibrates the vibration unit corresponding to a location of an obstacle which was detected in the surroundings of the mobile object.

Thereby, it is possible to make the user recognize where the obstacle exists with respect to the mobile object. For example, when the obstacle is detected in a front side of the mobile object, the vibration unit provided in the seat surface portion is vibrated, and when the obstacle is detected in a rear side, the vibration unit provided in the backrest portion is vibrated, then it becomes possible to make the user recognize whether the obstacle exists in the front side or the rear side. Further, when two vibration units are aligned in a width direction of the mobile object, in a case where the obstacle is detected in a left side of the mobile object, the vibration unit placed on a left side is vibrated, and in a case where the obstacle is detected in a right side of the mobile object, the vibration unit placed on a right side is vibrated, and then it becomes possible to make the user recognize whether the obstacle exists in the left side or the right side.

The higher an alarm level regarding the detected obstacle is, the shorter the control portion preferably makes a continuous vibration time in which the vibration unit is vibrated at the standard amplitude. When the continuous vibration time is made shorter, the number of resuming the vibration in a predetermined time increases. Since a user is more likely to recognize the vibration at the start of the vibration, when the alarm level regarding the obstacle is higher, the existence of the obstacle can be strongly recognized by shortening the continuous vibration time. Note that the alarm level regarding the obstacle may be determined according to a distance or a relative velocity between the mobile object and the obstacle.

A vibration control method according to the embodiment of the present invention is the vibration control method performed by the vibration control device independently controlling the plurality of vibration units capable of generating vibration which stimulates the user's body. In a case where two or more of the plurality of vibration units are vibrated for a same period of time, a low-vibration period which makes amplitude of all of the vibration units smaller than each standard amplitude thereof is controlled to be interposed between the first standard vibration period in which only a part of the vibration units is vibrated at the standard amplitude and the second standard vibration period in which only another part of the vibration unit is vibrated at the standard amplitude. According to such a vibration control method in the present embodiment, the vibration can be appropriately recognized by the user as descried above when using the plurality of vibration units.

Further, the above-mentioned vibration control method may be a vibration control program which is executed by a computer. By doing this way, the user can be caused to appropriately recognize the vibration by using the computer when using the plurality of vibration units.

Further, the above-mentioned vibration control program may be stored in a recording medium which can be read by a computer. By doing so, other than installing the program in a device, the program itself can be distributed, and upgrading a software version or the like can be easily performed.

EXAMPLE

Figure 1:
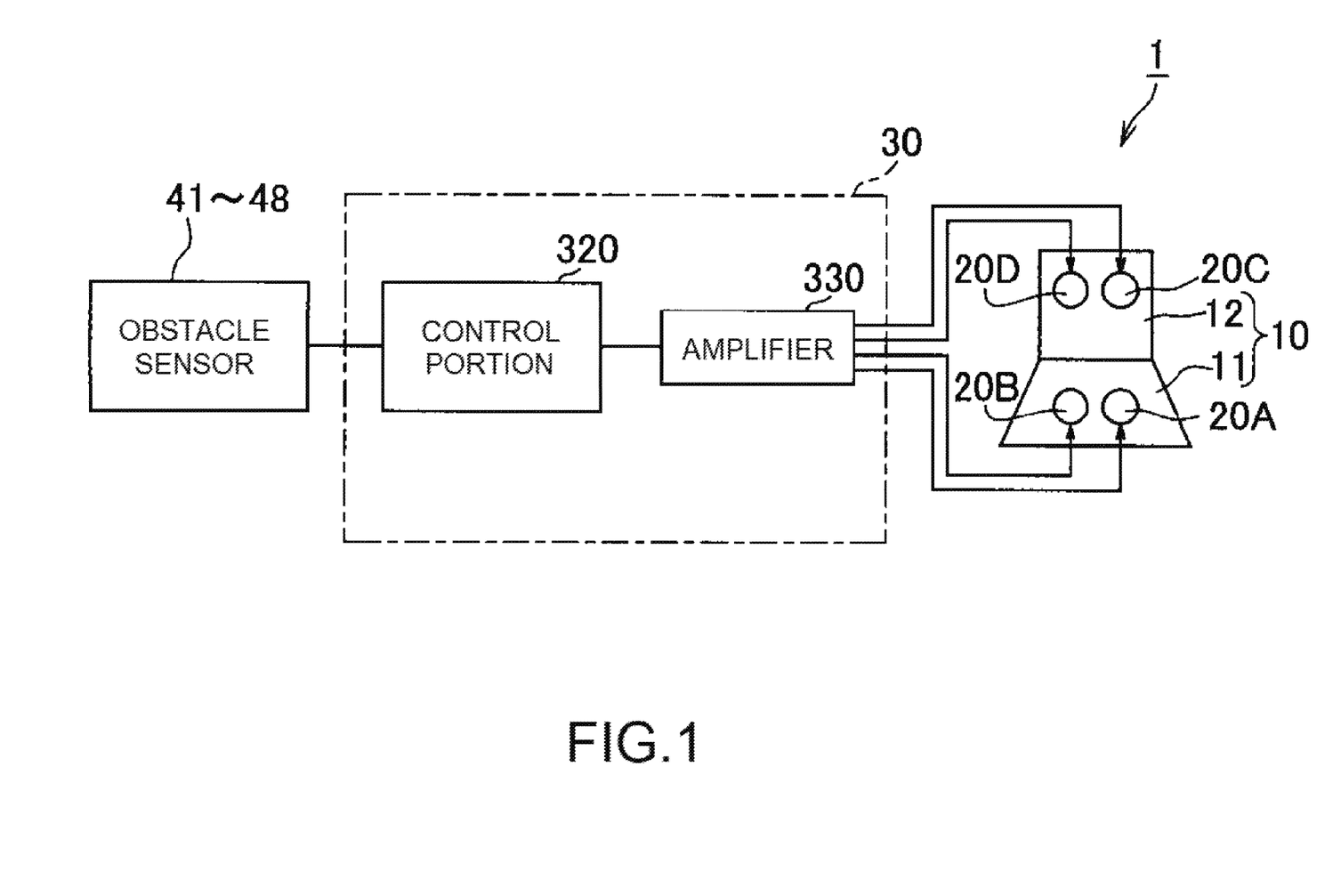
FIG. 1 is a block diagram illustrating an outline of a vehicle which is provided with a vibration control device according to an example of the present invention.
Figure 2:
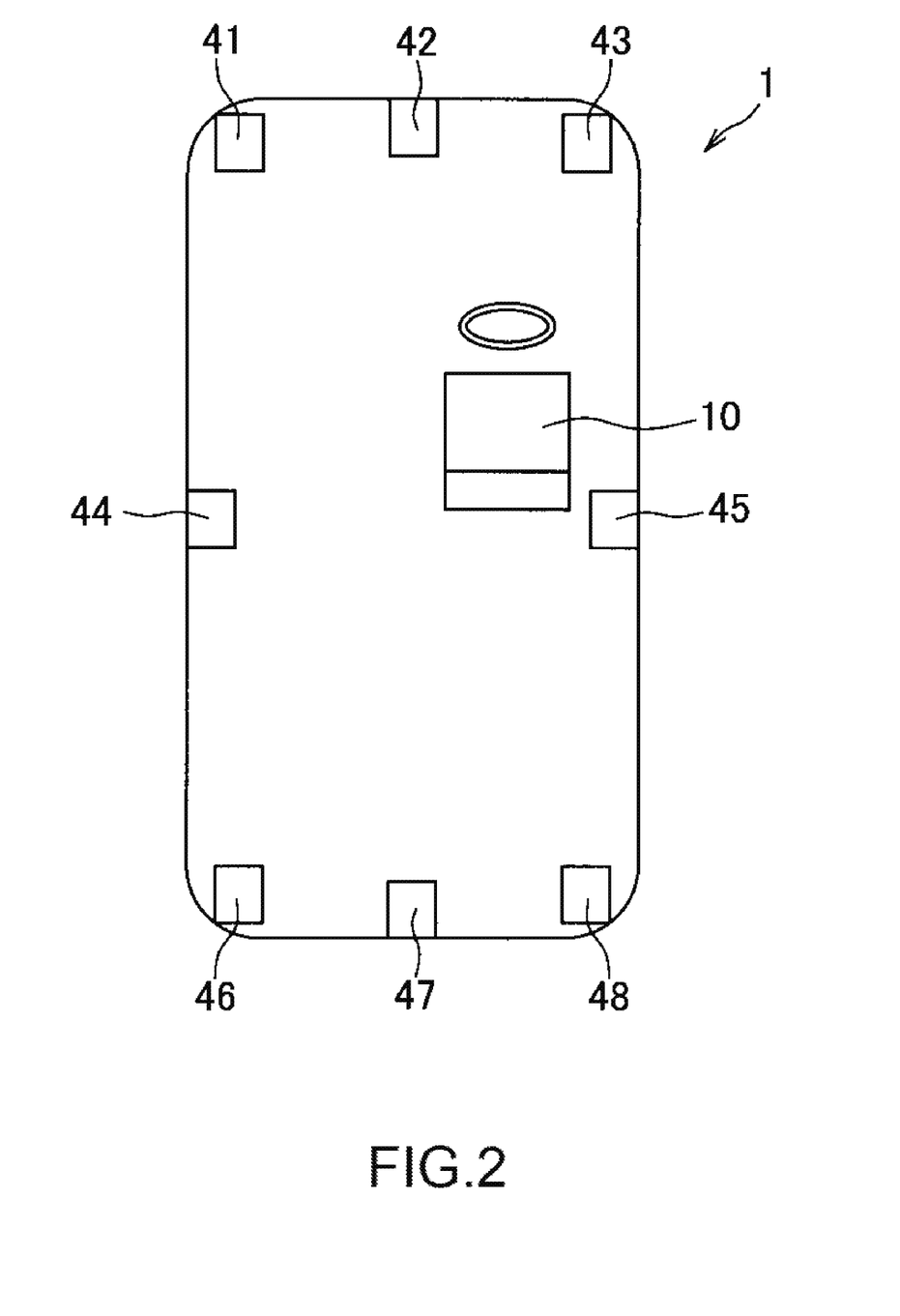
FIG. 2 is a plan view illustrating a state where the vehicle is provided with a sensor.

Example of the present invention will be described specifically below. A vibration control device 30 according to Example 1 of the present invention is, as illustrated in FIGS. 1 and 2, provided in a vehicle 1 as a mobile object, and includes a control portion 320 and an amplifier 330.

In the vehicle 1, a front left sensor 41 is provided at a front left side corner, a front center sensor 42 is provided at a center in a lateral direction on a front surface, a front right sensor 43 is provided at a front right side corner, a left sensor 44 is provided at a center in a front-back direction on a left surface, a right sensor 45 is provided at a center in the front-back direction on a right surface, a rear left sensor 46 is provided at a rear left side corner, a rear center sensor 47 is provided at a center in the lateral direction on a back surface, and a rear right sensor 48 is provided at a rear right side corner. That is, eight obstacle sensors are provided in the vehicle 1 so that obstacles which exist in a predetermined range from each obstacle sensor will be detected.

The sensors 41-48 are configured so as to detect other vehicles, road installation articles, pedestrians, or the like as obstacles, and to be able to detect a distance to the obstacle by sending and receiving, for example, electromagnetic waves. Further, relative velocity of the obstacle to the vehicle 1 may be calculated by dividing a distance to the obstacle by intervals of measuring times. The sensors 41-48 send a detection signal to the control portion 320 when detecting the obstacle. The detection signal includes information such as the distance to the obstacle and the relative velocity.

Figure 3:
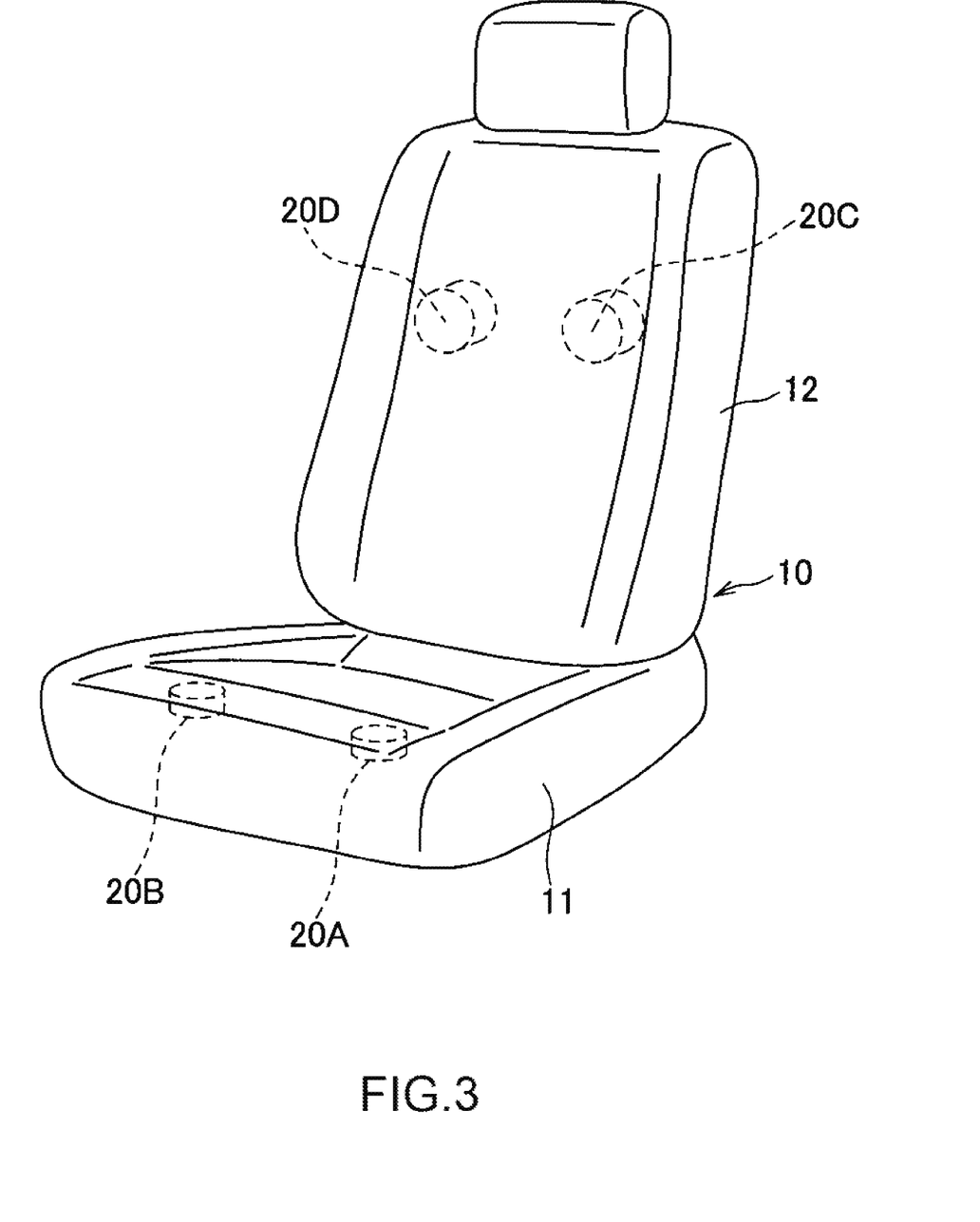
FIG. 3 is a side view illustrating a state where vibration units are provided in a seat of the vehicle.

As illustrated in FIG. 3, in a seat (driver's seat) 10 of the vehicle, a left side seat surface vibration unit 20A, a right side seat surface vibration unit 20B, a left side backrest vibration unit 20C, and a right side backrest vibration unit 20D are provided. That is, four vibration units are placed in different locations in one seat 10. The left side seat surface vibration unit 20A is placed further in a left side in a seat surface portion 11 of the seat 10 than the central portion in a width direction (lateral direction). The right side seat surface vibration unit 20B is placed further in a right side out of the seat surface portion 11 of the seat 10 than the central portion in the width direction (lateral direction). The left side backrest vibration unit 20C is placed further in the left side in a backrest portion 12 of the seat 10 than the central portion in the width direction (lateral direction). The right side backrest vibration unit 20D is placed further in the right side in the backrest portion 12 of the seat 10 than the central portion in the width direction (lateral direction).

Seat surface vibration units 20A-20B are provided so as to vibrate substantially orthogonally to an upper surface of the seat surface portion 11 (that is, having a direction along a vertical direction as a vibration direction), and transmit vibration to a thigh or a buttock of a seated person (user). The backrest vibration units 20C-20D are provided so as to vibrate substantially orthogonally to a front surface of the backrest portion 12 (that is, having a direction along a travelling direction of a vehicle as a vibration direction), and transmit vibration to the back of the seated person (user).

Figure 4:
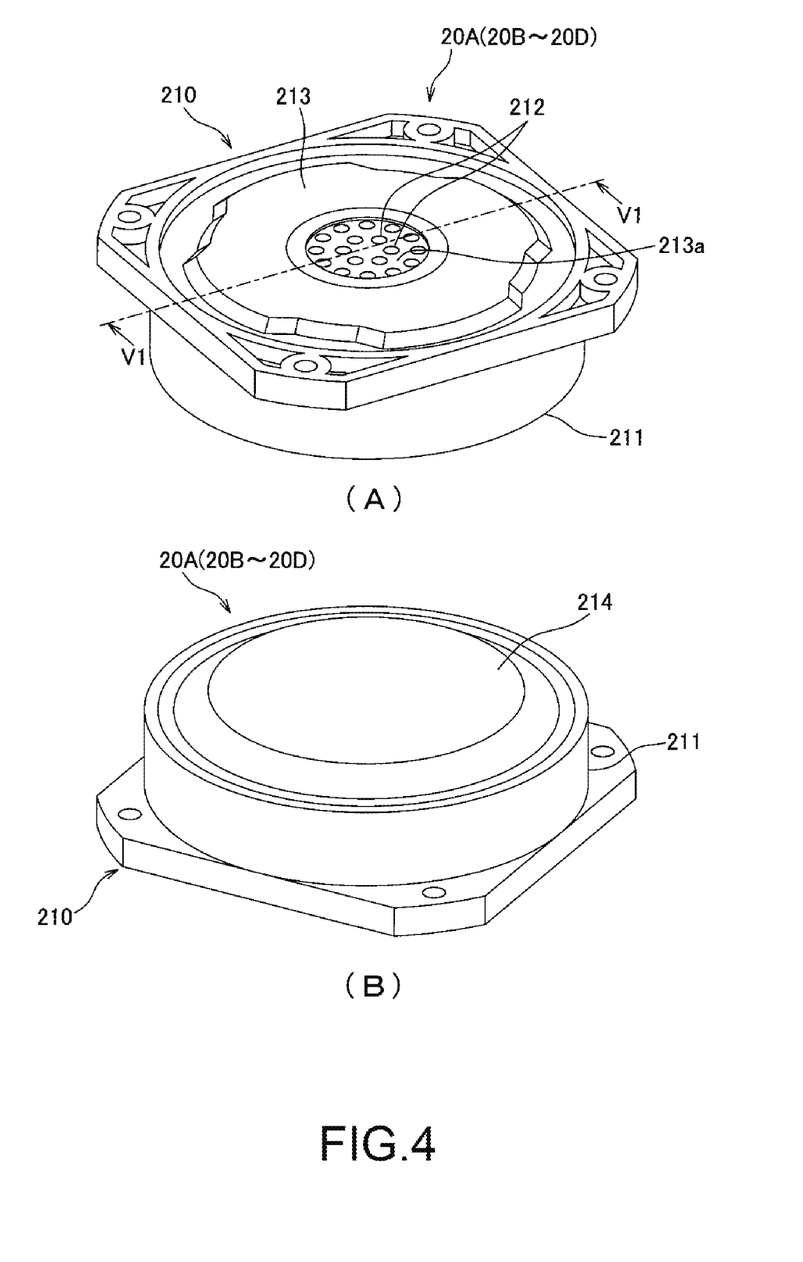
FIG. 4 is a perspective view illustrating one of the vibration units.
Figure 5:
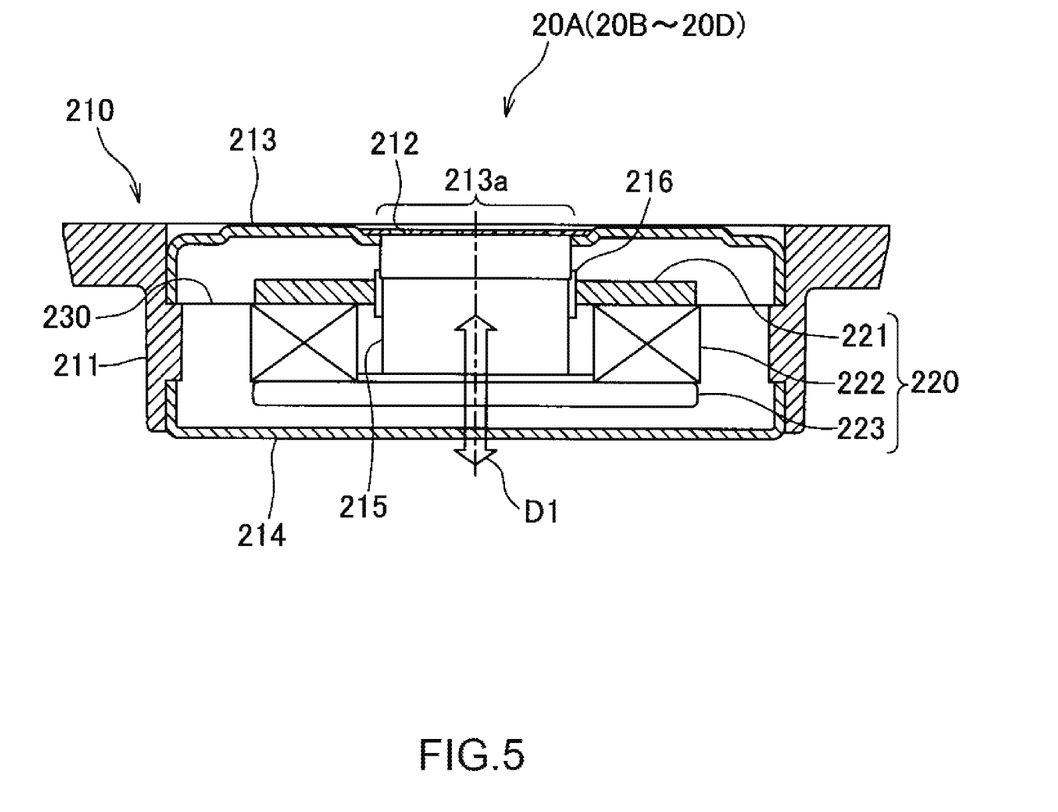
FIG. 5 is a cross-sectional view illustrating the vibration unit.

Here, details of vibration units 20A-20D will be described according to FIGS. 4 and 5. Note that FIG. 5 is a cross-sectional view illustrating a section along a cutting line V1-V1 in FIG. 4A.

Each of the vibration units 20A-20D is a magnetic circuit 220 accommodated in a case 210. The case 210 has an opening on one end side of a short cylindrical frame 211 closed by a circular first plate wall 213 having a plurality of through holes 212 provided in the central portion thereof, and an opening on the other end side closed by a circular second plate wall 214. The vibration units 20A-20D viewed from a side of the first plate wall 213 provided with the through holes 212 are illustrated in FIG. 4A, and the vibration units 20A-20D viewed from the opposite side are illustrated in FIG. 4B From the substantial center of the first plate wall 213, a cylindrical bobbin 215 is erected toward the circular second plate wall 214 surrounding the plurality of through holes 212, and a voice coil 216 is provided on a circumference of the bobbin 215. Thus, the voice coil 216 is fixed to the first plate wall 213 with the bobbin 215 interposed therebetween. Further, the plurality of through holes 212 are provided on a region 213a which corresponds to an inner side of the voice coil 216 in a planar view when seen from a direction intersecting the first plate wall 213.

The magnetic circuit 220 includes a plate 221 and a magnet 222 which are respectively ring shaped, and a disk-shaped yoke 223. The plate 221 and the magnet 222 are placed coaxially with a gap therebetween with respect to the voice coil 216. The plate 221, that is, the magnetic circuit 220 is supported by an inner wall of the cylindrical frame 211 through a damper 230 being able to vibrate in a contact or separate direction D1 with respect to the first plate wall 213.

When an AC signal is applied to the voice coil 216, the magnetic circuit 220 vibrates in the contact or separate direction D1 with respect to the first plate wall 213. Further, the case 210 vibrates due to reaction of the vibration through the damper 230. Thus, in the vibration units 20A-20D, a relative vibration occurs between the case 210 and the magnetic circuit 220 due to applying the AC signal to the voice coil 216. By this relative vibration, the vibration units 20A-20D vibrate entirely with the case 210. Further, in the case 210, the first plate wall 213 on which the voice coil 216 which receives reaction from the magnetic circuit 220 is fixed locally vibrates. Sound occurs due to the vibration of the first plate wall 213. Thus, the vibration units 20A-20D vibrate including the case 210 and emit the sound due to the relative vibration between the case 210 and the magnetic circuit 220 by applying the AC signal to the voice coil 216.

The control portion 320 is configured with a CPU (Central Processing Unit) provided with, for example, a memory such as RAM (Random Access Memory) or ROM (Read Only Memory), and manages total control of the vibration control device 30. That is, the control portion 320 calculates an alarm level according to a detection signal received from the sensors 41-48 and sends a drive signal to the vibration units 20A-20D.

The control portion 320 makes the alarm level higher when a distance to the obstacle is shorter, and makes the alarm level higher when relative velocity is higher. In the present embodiment, the alarm level is made to have three levels (high level, medium level, and low level). Note that the alarm level may be based only on the distance to the obstacle or based only on the relative velocity.

The amplifier 330 is provided between the control portion 320 and the vibration units 20A-20D, and the drive signal sent by the control portion 320 is amplified and supplied to the vibration units 20A-20D.

Figure 6:
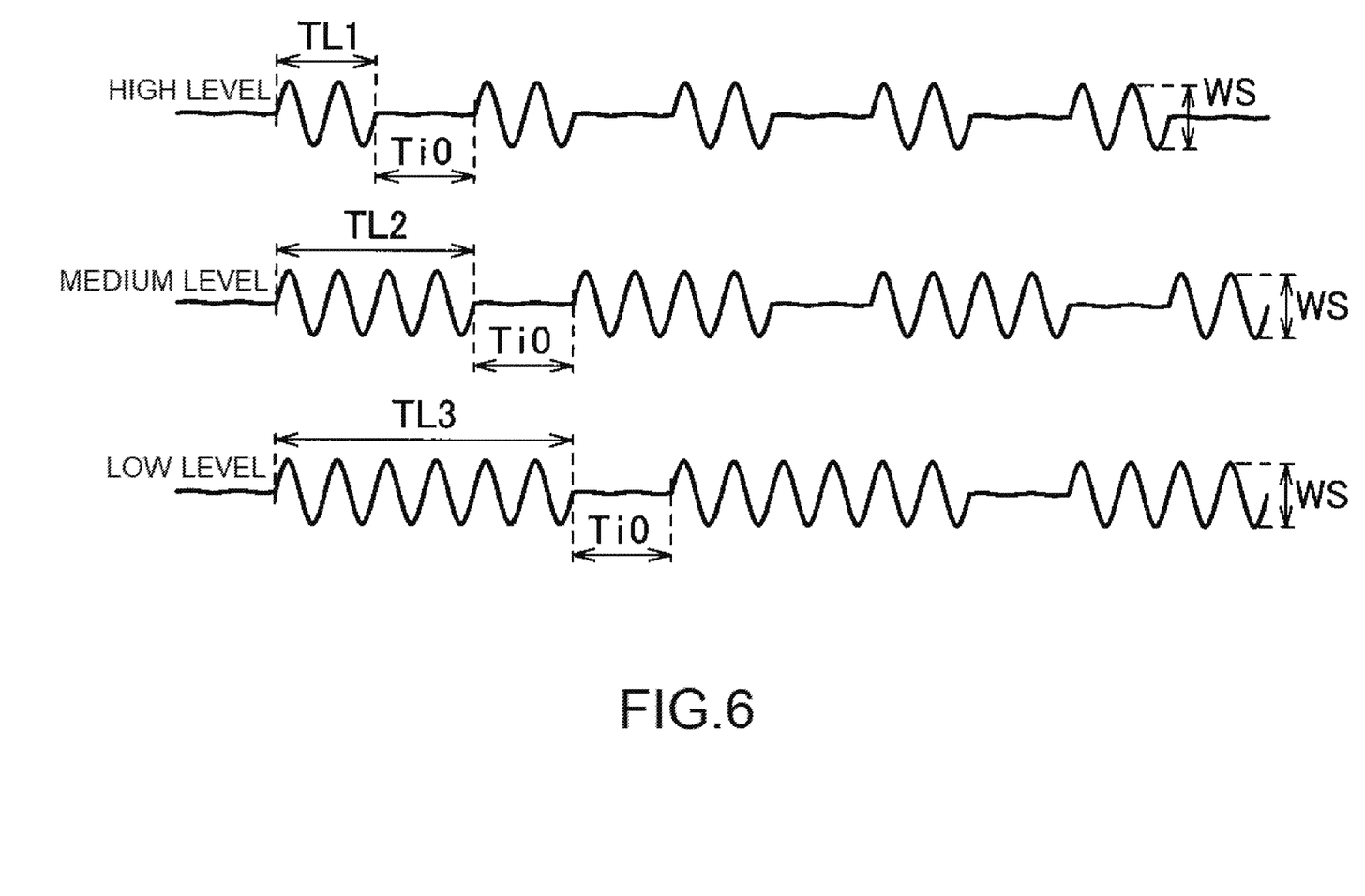
FIG. 6 is a graph showing a vibration pattern in a case where the one vibration unit vibrates independently.

The control portion 320 sends the drive signal so as to vibrate the vibration units 20A-20D at a vibration pattern corresponding to the alarm level. One example of a vibration pattern in a case where one of the vibration units 20A-20D is vibrated alone is illustrated in FIG. 6. At any alarm level, the vibration units 20A-20D continue vibration for a predetermined time (continuous vibration times TL1-TL3), and after an interval time Ti0, start continuing the vibration again, and repeat this process. At this time, the continuous vibration times TL1-TL3 change corresponding to the alarm level, while the interval time Ti0 is constant. When the alarm level is higher, the continuous vibration time becomes shorter, and the number of resuming the vibration in the predetermined time becomes larger. The number of resuming the vibration in the illustrated period of time is, in a case where the alarm level is high, five times, in a case where the alarm level is medium, four times, and in a case where the alarm level is low, three times. Further, amplitude in a case where one of the vibration units 20A-20D is independently vibrated is made a standard amplitude WS. The standard amplitude WS may be common amplitude with respect to all the vibration units, or different amplitude for each vibration unit according to sensitivity of the sense of touch for each portion of a body in order for each vibration unit to make the seated person (user) feel the same stimulus.

Further, the control portion 320 sends the drive signal in order to vibrate the vibration units 20A-20D corresponding to a location of an obstacle which was detected in the surroundings of the vehicle 1. The left side seat surface vibration unit 20A corresponds to the front left side corner (front left sensor 41), the right side seat surface vibration unit 20B corresponds to the front right side corner (front right sensor 43), the left side backrest vibration unit 20C corresponds to the rear left side corner (rear left sensor 46), and the right side backrest vibration unit 20D corresponds to the rear right side corner (rear right sensor 47). Relation between a sensor which detected the obstacle and the vibrating vibration unit is shown in Table 1.

TABLE 1

| SENSOR WHICH DETECTED OBSTACLE | VIBRATING VIBRATION UNIT |
|---|---|
| FRONT LEFT SENSOR 41 | LEFT SIDE SEAT SURFACE VIBRATION UNIT 20A |
| FRONT CENTER SENSOR 42 | LEFT SIDE SEAT SURFACE VIBRATION UNIT 20A + RIGHT SIDE SEAT SURFACE VIBRATION UNIT 20B |
| FRONT RIGHT SENSOR 43 | RIGHT SIDE SEAT SURFACE VIBRATION UNIT 20B |
| LEFT SENSOR 44 | LEFT SIDE SEAT SURFACE VIBRATION UNIT 20A + LEFT SIDE BACKREST VIBRATION UNIT 20C |
| RIGHT SENSOR 45 | RIGHT SIDE SEAT SURFACE VIBRATION UNIT 20B + RIGHT SIDE BACKREST VIBRATION UNIT 20D |
| REAR LEFT SENSOR 46 | LEFT SIDE BACKREST VIBRATION UNIT 20C |
| REAR CENTER SENSOR 47 | LEFT SIDE BACKREST VIBRATION UNIT 20C + RIGHT SIDE BACKREST VIBRATION UNIT 20D |
| REAR RIGHT SENSOR 48 | RIGHT SIDE BACKREST VIBRATION UNIT 20D |

Next, an example of the vibration pattern in a case where two or more of four vibration units 20A-20D are vibrated for a same period of time will be described.

[First Vibration Pattern]

As shown in Table 1, in a case where any of the sensors 42, 44, 45, and 47 detects an obstacle, the control portion 320 vibrates two vibration units. As one example of such a first vibration pattern, a case where the front center sensor 42 detects an obstacle will be described below.

Figure 7:
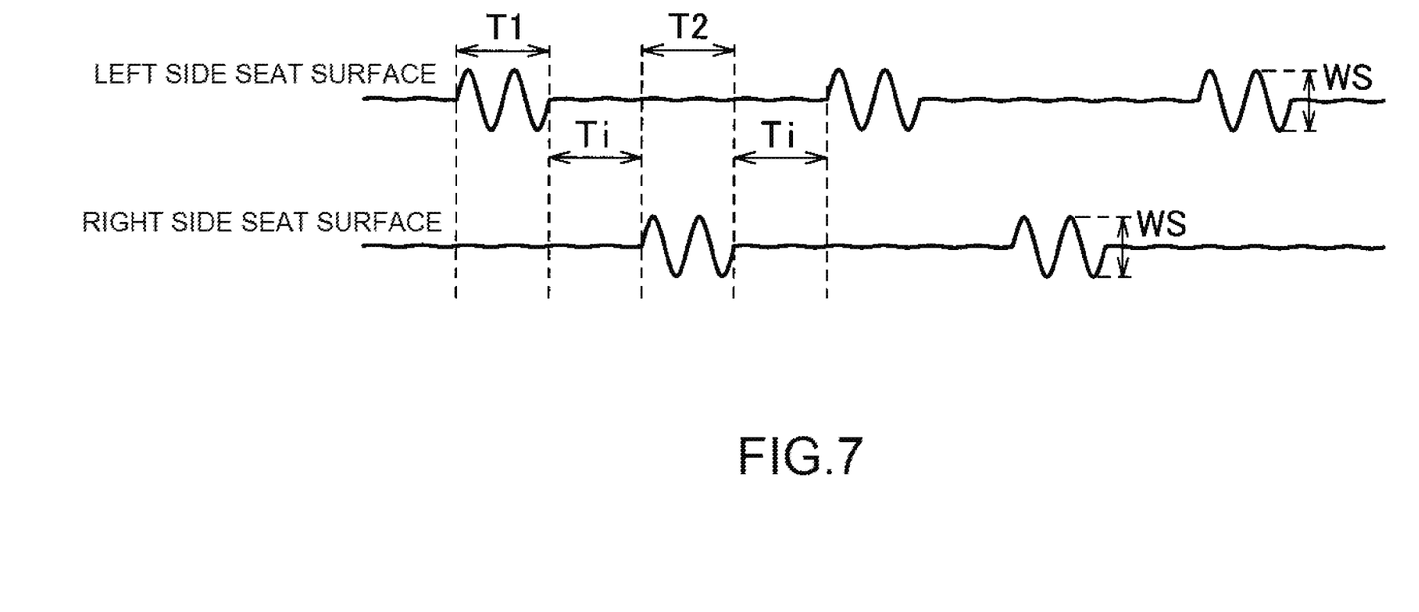
FIG. 7 is a graph showing an example of a first vibration pattern of the vibration unit.

A vibration pattern in a case where the front center sensor 42 detects an obstacle and an alarm level thereof is high is shown in FIG. 7. A first standard vibration period T1 in which only the left side seat surface vibration unit 20A is vibrated at a standard amplitude, a low vibration period Ti in which none of the vibration units 20A-20D is vibrated (amplitude is made smaller than the standard amplitude by making the amplitude zero), and a second standard vibration period T2 in which only the right side seat surface vibration unit 20B is vibrated at the standard amplitude are continuous, and the first standard vibration period T1, the low vibration period Ti, and the second standard vibration period T2 are made one set and the set is repeated. That is, the low vibration period Ti is interposed between the first standard vibration period T1 and the second standard vibration period T2, and the first standard vibration period T1 and the second standard vibration period T2 are alternated with the low vibration period Ti interposed therebetween.

Duration of the first standard vibration period T1 and the second standard vibration period T2 is equal to the continuous vibration time TL1 in a case where the alarm level thereof is high and respective vibration units 20A-20D are independently vibrated. Further, duration of the low vibration period Ti is equal to or longer than the shortest time (for example, 0.3 to 1 second) in which a user can recognize that a stimulus by a vibration is gone. Note that the duration of the low vibration period Ti may be equal to the interval time Ti0 in a case where the respective vibration units 20A-20D are independently vibrated.

Figure 8:
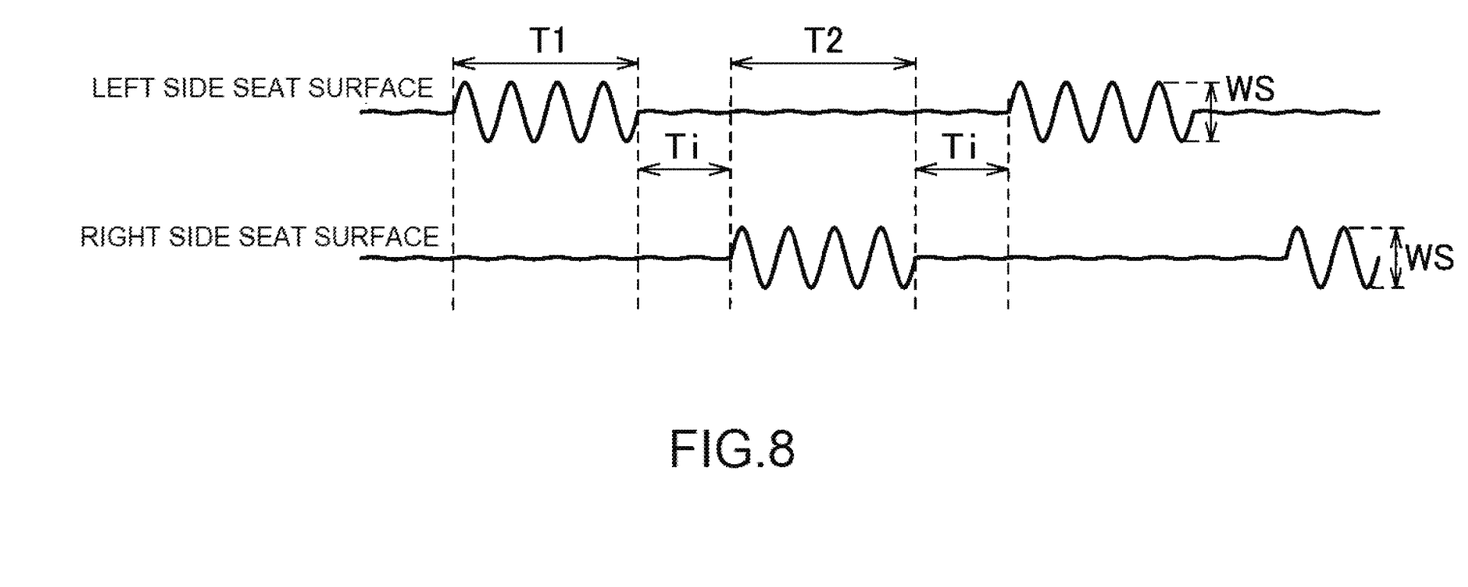
FIG. 8 is a graph showing another example of a first vibration pattern of the vibration unit.

A vibration pattern in a case where the front center sensor 42 detects an obstacle and an alarm level thereof is medium is shown in FIG. 8. As is the case with the vibration pattern shown in FIG. 7, the first standard vibration period T1 and the second standard vibration period T2 are alternated with the low vibration period Ti interposed therebetween. At this time, the duration of the first standard vibration period T1 and the second standard vibration period T2 is equal to the continuous vibration time TL2 in a case where the alarm level is medium and one of the vibration units 20A-20D is independently vibrated. Further, the duration of the low vibration period Ti is equal to the duration of the low vibration period Ti at the vibration pattern shown in FIG. 7.

[Second Vibration Pattern]

In a case where an obstacle or the vehicle 1 moves from a state in which the obstacle is detected by sensors 41, 43, 46, and 48 at a corner and then thereby the obstacle is detected by sensors 42, 44, 45, and 47 in the center in a front-back direction or the width direction, a state in which one vibration unit vibrates changes to a state in which two vibration units vibrates. Further, in a state in which an obstacle is detected by one sensor at a corner, also in a case where an obstacle is newly detected by another sensor at a corner, the state in which one vibration unit vibrates changes to the state in which two vibration units vibrates.

As one example of a second vibration pattern which newly vibrates another vibration unit in a state in which one vibration unit is vibrated in this manner, a case in a state in which an obstacle is detected at a high alarm level by the rear right sensor 48 where another obstacle is newly detected at a low alarm level by the front left sensor 41 will be described below.

Figure 9:
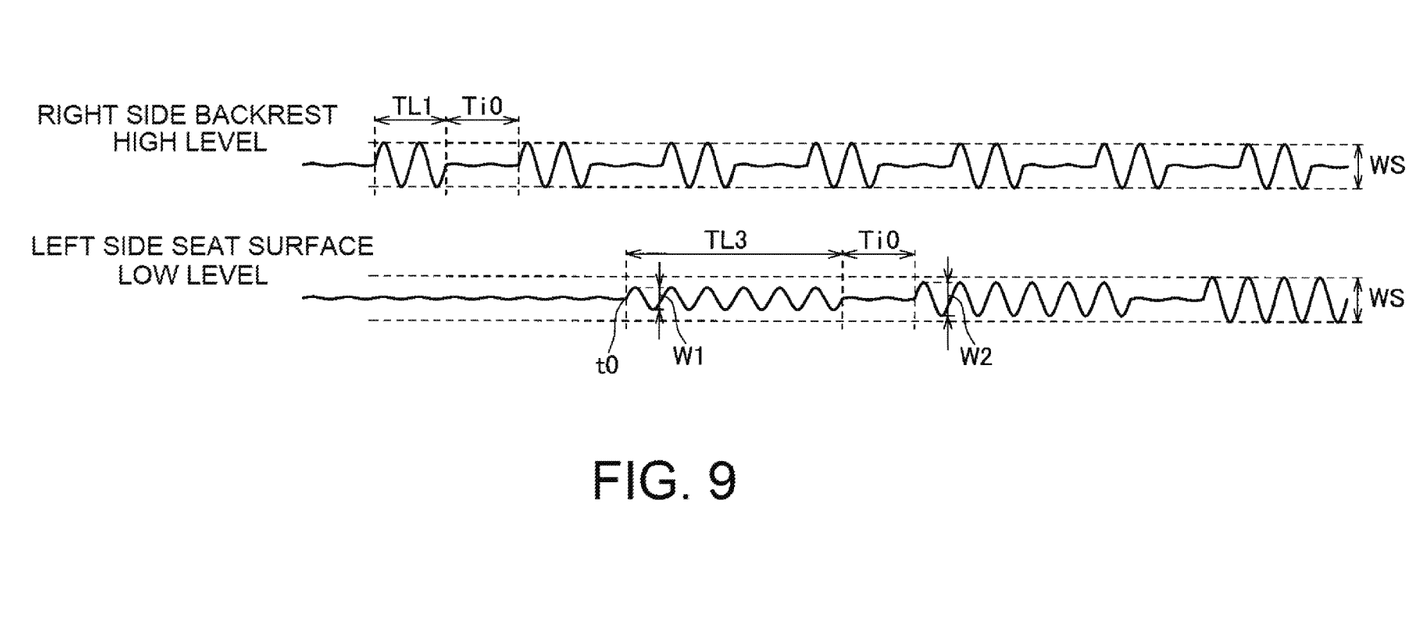
FIG. 9 is a graph showing an example of a second vibration pattern of the vibration unit.

In a state in which the obstacle is detected at the high alarm level by the rear right sensor 48, a vibration pattern in a case where another obstacle is detected at the low alarm level by the front left sensor 41 is shown in FIG. 9.

First, the right side backrest vibration unit 20D is vibrating at an interval of the interval time Ti0 in the continuous vibration time TL1 which corresponds to a high alarm level, and the amplitude thereof is the same as the standard amplitude WS. When another obstacle is newly detected by the front left sensor 41 at a timing t0, the left side seat surface vibration unit 20A starts vibrating. At this time, amplitude W1 of the left side seat surface vibration unit 20A is smaller than the standard amplitude WS, and amplitude ratio of the amplitude W1 with respect to the standard amplitude WS (W1/WS) is less than 1. On the other hand, amplitude of the right side backrest vibration unit 20D is constant, and the amplitude ratio thereof is 1.

Further, the left side seat surface vibration unit 20A vibrates at the interval time Ti0 in the continuous vibration time TL3 which corresponds to a low alarm level. After a first interval time Ti0, amplitude W2 of the left side seat surface vibration unit 20A is made larger than the amplitude W1 so as to be made closer to the standard amplitude WS. After a second interval time Ti0, the amplitude of the left side seat surface vibration unit 20A is made the standard amplitude WS. That is, by gradually making the amplitude of the left side seat surface vibration unit 20A large for the amplitude to be the standard amplitude WS, the amplitude ratio is made 1 after a predetermined time has passed since the start of the vibration.

[Third Vibration Pattern]

In a case where the obstacle is detected by sensors 44 and 45 in the central portion in the front-back direction, a seat surface vibration unit and a backrest vibration unit vibrate for the same period of time. Further, also in a case where an obstacle is detected by both of a front sensor and a rear sensor, the seat surface vibration unit and the backrest vibration unit vibrate for the same period of time.

As one example of a third vibration pattern which vibrates the backrest vibration units 20A and 20B and the backrest vibration units 20C and 20D for the same period of time in the above mentioned manner, a case where a state in which an obstacle is detected at a high alarm level by the front right sensor 43 changes to a state in which this obstacle is detected at the high alarm level by the right sensor 45 will be described below.

Figure 10:
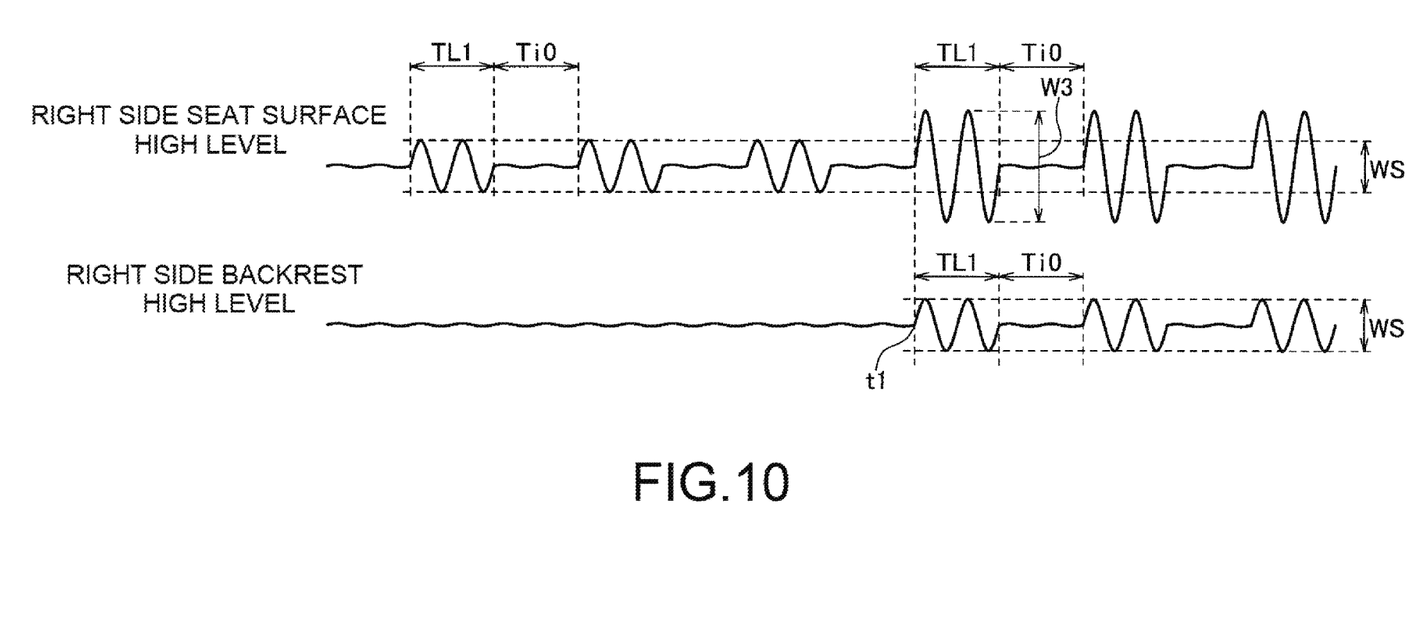
FIG. 10 is a graph showing an example of a third vibration pattern of the vibration unit.

A vibration pattern in a case where the state in which the obstacle is detected at the high alarm level by the front right sensor 43 changes to the state in which this obstacle is detected at the high alarm level by the right sensor 45 is shown in FIG. 10. First, the right side seat surface vibration unit 20B is vibrating at an interval of the interval time Ti0 in the continuous vibration time TL1 which corresponds to a high alarm level, and amplitude thereof is the same as the standard amplitude WS. When this obstacle is newly detected by the right sensor 45 at a timing t1, the right side backrest vibration unit 20D starts vibrating. At this time, the right side backrest vibration unit 20D has amplitude which is the same as the standard amplitude WS, and vibrates at the interval time Ti0 in the continuous vibration time TL1 which corresponds to a high alarm level. On the other hand, the right side seat surface vibration unit 20B vibrates at amplitude W3 which is larger than the standard amplitude WS after t1. Further, the interval time Ti0 of the right side seat surface vibration unit 20B and the interval time Ti0 of the right side backrest vibration unit 20D are set at the same timing.

[Effect of First Vibration Pattern]

By the above-mentioned configuration, in the first vibration pattern, by making the low vibration period Ti interposed between the first standard vibration period T1 and the second standard vibration period T2, a user recognizes more easily a vibration of a vibration unit (the right side seat surface vibration unit 20B in the above-mentioned example) which vibrates in the second standard vibration period T2. Therefore, even when the user's weight acts on a vibrating vibration unit lightly in the second standard vibration period T2, vibration of this vibration unit is easily recognized.

Further, at the first vibration pattern, since the first standard vibration period T1 and the second standard vibration period T2 are alternated with the low vibration period Ti interposed therebetween, both of the first standard vibration period T1 and the second standard vibration period T2 follow after the low vibration period Ti, and vibration of the vibrating vibration unit in either standard vibration period is easily recognized.

Further, in the first vibration pattern, since duration of the low vibration period Ti is equal to or longer than the shortest time in which the user can recognize that a stimulus by vibration is gone, a user recognizes more easily the vibration of the vibration unit.

Further, two out of four vibration units 20A-20D are placed in different locations in the width direction of the seat surface portion 11, and along with that the other two are placed in different locations in the width direction of the backrest portion 12, and by vibrating the vibration units corresponding to a location of a detected obstacle, it is possible to make the user recognize in which of the front, the rear, the right, and the left of the vehicle 1 the obstacle exists.

Further, by making a continuous vibration time of the vibration units 20A-20D shorter as an alarm level regarding the obstacle is higher, it is possible to make the user recognize strongly that the obstacle exists.

[Effect of Second Vibration Pattern]

By the above-mentioned configuration, in the second vibration pattern, by making an amplitude ratio of the vibration unit which is newly vibrated smaller than that of a vibration unit which is already vibrating, it is possible to inhibit a user from excessively recognizing vibration of the vibration unit which is newly vibrated. That is, when the user is used to vibration of the vibration unit which is already vibrating, the user tends to recognize new vibration more strongly, and it may become difficult to determine whether the vibration unit which is already vibrating is operating or not. Hence, by making the amplitude ratio of the vibration unit which is newly vibrated small, it is possible to make the vibration of the vibration unit which is already vibrating easily recognized. Therefore, when a plurality of vibration units are used, it is possible to make the user recognize the vibration appropriately.

Further, in the second vibration pattern, making the amplitude ratio of the vibration unit which is newly vibrated 1 after a predetermined time has passed since the start of the vibration enables the user to easily recognize the vibration of the vibration unit which is newly vibrated. That is, it is possible to inhibit the vibration from becoming difficult to be recognized when the user is used to this vibration after time has passed since the start of the vibration of the vibration unit which is newly vibrated.

Further, two out of the four vibration units 20A-20D are placed in different locations in the width direction of the seat surface portion 11, the other two are placed in different locations in the width direction of the backrest portion 12, and a vibration unit corresponding to a location of a detected obstacle is vibrated, thereby making the user recognize in which of the front, the rear, the right, and the left of the vehicle 1 the obstacle exists.

Further, by making a continuous vibration time of the vibration units 20A-20D shorter as an alarm level regarding the obstacle is higher, it is possible to make the user recognize more easily that the obstacle exists.

[Effect of Third Vibration Pattern]

By the above-mentioned configuration, in the third vibration pattern, in a case where the backrest vibration unit and the seat surface vibration unit are vibrated for the same period of time, by making amplitude of the seat surface vibration unit larger than that in a case where only the seat surface vibration unit is vibrated, it is possible to make both of the vibration of the backrest vibration unit and that of the seat surface vibration unit easily recognized by the user.

In a case where the backrest vibration unit and the seat surface vibration unit are vibrated at the same amplitude, the user tends to recognize the vibration of the backrest vibration unit more strongly, and it becomes difficult to determine whether the backrest vibration unit is vibrating or not. Hence, making the amplitude of the seat surface vibration unit larger than a case where only the seat surface vibration unit is vibrated enables the user to easily recognize the vibration of the seat surface vibration unit. Therefore, when the plurality of vibration units are used, it is possible to make the user recognize the vibration appropriately. Further, in a case where only the seat surface vibration unit is vibrated, the user recognizes this vibration easily, and when amplitude at the time when only the seat surface vibration unit is independently vibrated is varied from amplitude at the time when the plurality of vibration units are vibrated, the amplitude does not become too large when only the seat surface being vibrated, and discomfort is hardly given to the user.

Further, in the third vibration pattern, by making amplitude of the backrest vibration unit the same as amplitude (standard amplitude WS) at the time when only the backrest vibration unit is vibrated, it is possible to inhibit the vibration of the backrest vibration unit from becoming difficult to be recognized by the user.

Further, since two out of the four vibration units 20A-20D are placed in different locations in the width direction of the seat surface portion 11, the other two are placed in different locations in the width direction of the backrest portion 12, and the vibration unit corresponding to a location of a detected obstacle is vibrated, it is possible to make the user recognize in which of the front, the rear, the right, and the left of the vehicle 1 the obstacle exists.

Further, by making a continuous vibration time of the vibration units 20A-20D shorter as an alarm level regarding the obstacle is higher, it is possible to make the user recognize more easily that the obstacle exists.

Note that the present invention is not limited to the aforementioned Example, but includes other configurations which can achieve the object of the invention, and the following modifications are also included in the invention.

For example, in the first vibration pattern in the aforementioned Example, vibration of all of the vibration units 20A-20D are stopped in the low vibration period Ti, however, in the low vibration period, amplitude of all of vibration units may be smaller than respective standard amplitude, and for example, the vibration units may be vibrated at amplitude on a level in which vibration cannot be felt by the user (insensible amplitude). The insensible amplitude may have the size which corresponds to, for example, a distance between the vibration unit and the user, a member interposed therebetween, a location, or locations of the vibration units (whether to be placed on the seat surface portion or to be placed on the backrest portion).

Further, in the first vibration pattern in the aforementioned Example, the duration of the low vibration period Ti is equal to or longer than the shortest time in which the user can recognize that a stimulus by vibration is gone, however, the duration of the low vibration period may be shorter than this shortest time. Even when the user does not recognize there is no stimulus by vibration of all of the vibration elements, by providing the low vibration period, the user recognizes more easily the vibration in the standard vibration period which follows after the low-vibration period.

Further, in the second vibration pattern in the aforementioned Example, the amplitude ratio of the vibration unit which is newly vibrated was made less than 1, and the amplitude ratio of the vibration unit which is already vibrating was made 1, however, the amplitude ratio of the vibration unit which is already vibrating may be made larger than 1. In this case also, the vibration of the vibration unit which is already vibrating can be easily recognized by the user. Note that in a case where the amplitude ratio of the vibration unit which is already vibrating is made larger than 1, by gradually making the amplitude small, the amplitude ratio may be made 1 after the predetermined time has passed since the start of the vibration. Further, the amplitude ratio of the vibration unit which is newly vibrated may be made less than 1, and the amplitude ratio of the vibration unit which is already vibrating may be made larger than 1. Further, the amplitude ratio of the vibration unit which is newly vibrated may be smaller than the amplitude ratio of the vibration unit which is already vibrating, and any of these amplitude ratios may be less than 1 or may be larger than 1.

Further, in the second vibration pattern in the aforementioned Example, by gradually making the amplitude of the vibration unit which is newly vibrated larger, the amplitude ratio is made 1 after a predetermined time has passed since the start of the vibration, however, the amplitude ratio may be made 1 by making the amplitude larger in one step after the predetermined time has passed since the start of the vibration. Further, the amplitude of the vibration unit which is newly vibrated may be made larger than 1 when the predetermined time has passed since the start of the vibration, or the amplitude ratio may be made not to rise up to 1 (that is, the upper limit may be set to be less than 1).

Further, in the second vibration pattern in the aforementioned Example, the standard amplitude in a case where one vibration unit is vibrated and the standard amplitude in a case where the plurality of vibration units are vibrated are the same, however, apart from the amplitude when the vibration unit is independently vibrated, the standard amplitude in a case where the plurality of vibration units are vibrated may be set. For example, when the plurality of vibration units are vibrated, in order not to make a stimulus to the user too strong, the standard amplitude may be smaller than the one in a case where one vibration unit is vibrated.

Further, in the third vibration pattern in the aforementioned Example, in a case where the backrest vibration unit and the seat surface vibration unit are vibrated for the same period of time, amplitude of the seat surface vibration unit is made larger than that in a case where only the seat surface vibration unit is vibrated, however, amplitude of the backrest vibration unit may be made smaller than that in a case where only the backrest vibration unit is vibrated. In this case also, it is possible to make both of the vibration of the backrest vibration unit and that of the seat surface vibration unit easily recognized by the user. At this time, the amplitude of the seat surface vibration unit may be made the same as the one in a case where only the seat surface vibration unit is vibrated. Further, in a case where the backrest vibration unit and the seat surface vibration unit are vibrated for the same period of time, the amplitude ratio of the seat surface vibration unit may be made larger than that in a case where only the seat surface vibration unit is vibrated, and the amplitude of the backrest vibration unit may be made smaller than that in a case where only the backrest vibration unit is vibrated.

Further, in the aforementioned Example, two out of the four vibration units 20A-20D are placed in different locations in the width direction of the seat surface portion 11, and the other two are placed in different locations in the width direction of the backrest portion 12, however, the number or a location of the vibration unit is not limited to this, and vibration of at least two of the vibration units may be controlled.

For example, one vibration unit is placed in each of the seat surface portion and the backrest portion, and a vibration unit in the seat surface portion may be vibrated in a case where an obstacle is detected in a front side, and a vibration unit in the backrest portion may be vibrated in a case where an obstacle is detected in a rear side. Further, the plurality of vibration units are juxtaposed in the width direction in the seat surface portion or the backrest portion, and when the obstacle is detected in the left side, the vibration unit on the left side may be vibrated, and when the obstacle is detected in the right side, the vibration unit on the right side may be vibrated. Further, by juxtaposing the plurality of vibration units in the front-back direction in the seat surface portion or by juxtaposing the plurality of vibration units in a vertical direction in the backrest portion, each vibration unit may be vibrated according to a detection of the obstacle in the front side or the rear side.

Further, in the aforementioned Example, the higher an alarm level regarding the obstacle is, the shorter a continuous vibration time of the vibration units 20A-20D is made to be, however, the higher the alarm level is, amplitude of the vibration unit may be set larger, or a frequency thereof may be set higher. Further, an intensity of the alarm level may be distinguished by combining, for example, an alarm using a sound or light and an alarm by a vibration.

Further, in the aforementioned Example, when vibrating two vibration units for the same period of time, respective ones of the first vibration pattern in which the low vibration period Ti is provided, the second vibration pattern in which the amplitude ratio of the vibration unit which is newly vibrated is made smaller than the amplitude ratio of the vibration unit which is already vibrating, and the third vibration pattern in which the amplitude of the seat surface vibration unit in a case where the seat surface vibration unit and the backrest vibration unit are vibrated for the same period of time is made larger than the one in a case where only the seat surface vibration unit is vibrated are shown independently, however, a vibration pattern may be a vibration pattern in which these are appropriately combined.

For example, if while vibrating one vibration unit in combination of the first vibration pattern and the second vibration pattern, another vibration unit is newly vibrated, the low vibration period may be provided. Further, in a case where the first vibration pattern and the third vibration pattern are combined and the seat surface vibration unit and the backrest vibration unit are vibrated for the same period of time, the low vibration period may be provided. Further, if while vibrating the backrest vibration unit (or the seat surface vibration unit) in combination of the second vibration pattern and the third vibration pattern, the seat surface portion unit (or the backrest vibration unit) is newly vibrated, the amplitude ratio of the newly vibrated vibration unit may be made smaller than the amplitude ratio of the vibration unit which is already vibrating. Thus, in a case where the second vibration pattern and the third vibration pattern are combined, the standard amplitude ratio of the seat surface vibration unit when the seat surface vibration unit and the backrest vibration unit are vibrated for the same period of time may be made larger than the amplitude when only the seat surface vibration unit is vibrated.

Although the best configuration and method for carrying out the present invention have been described above, the invention is not limited to them. That is, the invention is illustrated and described concerning the specific embodiment, but a person skilled in the art can variously modify the above-described embodiment in terms of shapes, materials, the numbers and other detailed configurations. Therefore, the descriptions to limit the above-disclosed shapes and materials are illustratively described to make it easy to understand the present invention, and they do not limit the invention. Thus, descriptions of names of members from which a portion or all of the limitations such as the shapes and the materials are removed are included in the invention.

1 vehicle (mobile object)
10 seat
11 seat surface portion
12 backrest portion
20A to 20D vibration unit
30 vibration control device
320 control portion
41 to 48 sensor

The invention claimed is:

1. A vibration control device comprising:
a control portion independently controlling a plurality of vibration units capable of generating a vibration that stimulates a user's body,
wherein the control portion controls, in a case where two or more of the plurality of vibration units are vibrated for a same period of time, a low-vibration period in which amplitude of all of the vibration units is smaller than each standard amplitude thereof so that the low-vibration period is interposed between a first standard vibration period wherein only a part of the vibration units vibrates at the standard amplitude and a second standard vibration period wherein only another part of the vibration units vibrates at the standard amplitude,
wherein a plurality of low-vibration periods are provided and two or more first standard vibration periods are provided, and
wherein the first standard vibration period and the second standard vibration period are alternated by the control portion with each of the low-vibration periods interposed therebetween.

2. The vibration control device according to claim 1, wherein duration of the low-vibration period is equal to or longer than the shortest time taken by the user to recognize that a stimulus by the vibration is gone.

3. The vibration control device according to claim 1, wherein the plurality of vibration units are placed in different locations in one seat in a mobile object.

4. The vibration control device according to claim 3, wherein at least one of the plurality of vibration units is placed in a seat surface portion of the seat and at least one of the plurality of vibration units is placed in a backrest portion of the seat.

5. The vibration control device according to claim 3, wherein the control portion vibrates the vibration unit corresponding to a location of an obstacle detected in the surroundings of the mobile object.

6. The vibration control device according to claim 1, wherein as an alarm level regarding a detected obstacle is increased, the control portion makes a continuous vibration time shorter in which the vibration unit is vibrated at the standard amplitude.

7. A vibration control method performed by a vibration control device independently controlling a plurality of vibration units capable of generating a vibration that stimulates a user's body,
the vibration control method comprising:
controlling, in a case where two or more of the plurality of vibration units are vibrated for a same period of time, a low-vibration period in which amplitude of all of the vibration units is smaller than each standard amplitude thereof so that the low-vibration period is interposed between a first standard vibration period wherein only a part of the vibration units is vibrated at the standard amplitude and a second standard vibration period wherein only another part of the vibration units is vibrated at the standard amplitude, wherein a plurality of low-vibration periods are provided and two or more first standard vibration periods are provided, and wherein the first standard vibration period and the second standard vibration period are alternated with each of the low-vibration periods interposed therebetween.

8. A computer readable non-transitory recording medium having stored thereon a vibration control program when executed on a processor of a computer causing the vibration control method according to claim 7 to be performed by the computer.

* * * * *